United States Patent [19]

Ito

[11] Patent Number: 5,594,783

[45] Date of Patent: Jan. 14, 1997

[54] TELEPHONE APPARATUS FOR RECORDING A PREDETERMINED MESSAGE IN PLACE OF A CNG TONE

[75] Inventor: Fumihiko Ito, Funabashi, Japan

[73] Assignee: Canon Kabushiki Kaisha, Tokyo, Japan

[21] Appl. No.: 632,731

[22] Filed: Apr. 18, 1996

Related U.S. Application Data

[63] Continuation of Ser. No. 546,734, Oct. 23, 1995, abandoned, which is a continuation of Ser. No. 195,638, Feb. 14, 1994, abandoned.

[30] Foreign Application Priority Data

Feb. 15, 1993 [JP] Japan ................................ 5-025651
Dec. 13, 1993 [JP] Japan ................................ 5-311525

[51] Int. Cl.⁶ .......................... H04M 1/64; H04N 1/32
[52] U.S. Cl. .......................... 379/68; 379/67; 379/88; 379/100
[58] Field of Search ...................... 379/67, 85, 71, 379/88, 89, 100

[56] References Cited

U.S. PATENT DOCUMENTS

| | | | |
|---|---|---|---|
| 4,677,660 | 6/1987 | Yoshida | 379/100 |
| 4,800,439 | 1/1989 | Yoshino | 358/438 |
| 4,815,121 | 3/1989 | Yoshida | 379/67 |
| 4,847,889 | 7/1989 | Eswaran | 379/77 X |
| 4,868,865 | 9/1989 | Ogawa et al. | 379/100 |
| 4,916,607 | 4/1990 | Teraichi et al. | 395/200 |
| 4,932,048 | 6/1990 | Kenmochi et al. | 379/67 |
| 4,974,253 | 11/1990 | Hashimoto | 379/82 |
| 4,998,272 | 3/1991 | Hawkins, Jr. et al. | 379/77 X |
| 5,127,047 | 6/1992 | Bell et al. | 379/93 X |
| 5,151,972 | 9/1992 | Lorenz et al. | 379/93 |
| 5,163,082 | 11/1992 | Karnowski | 379/88 |
| 5,278,896 | 1/1994 | Sakata et al. | 379/67 X |
| 5,333,179 | 7/1994 | Yamamoto et al. | 379/80 |
| 5,349,636 | 9/1994 | Irribarren | 379/100 X |

FOREIGN PATENT DOCUMENTS 531217  10/1993  European Pat. Off. ......... H04N 1/32

OTHER PUBLICATIONS

TAD 252 Answering System Owner's Manual, Cat No. 43–395, 1987.
Hellos Direct Catalog, p. 31, c 1991.
Voice News, vol. 8, No. 7, Jul. 1988.
Sears Owners Manual Model 329.59221950 1991.

*Primary Examiner*—Krista M. Zele
*Assistant Examiner*—Daniel S. Hunter
*Attorney, Agent, or Firm*—Morgan & Finnegan, LLP

[57] ABSTRACT

An telephone answering apparatus connected to a facsimile apparatus. A controller transmits a response message stored in a memory to the line, and starts recording an incoming message inputted from the line into the memory. In a case where a tone detector detects a tone signal, the controller releases the line and records a switching message stored in the memory instead of the incoming message. This prevents wasting incoming message storing capacity due to recording a tone signal and erroneous operation of the facsimile apparatus caused by reproducing a recorded tone signal.

22 Claims, 4 Drawing Sheets

TELEPHONE APPARATUS FOR RECORDING A PREDETERMINED MESSAGE IN PLACE OF A CNG TONE

This is a application Ser. No. 08/546,734 filed on Oct. 23, 1995 now abandoned, which is a continuation of abandoned application Ser. No. 08/195,638, filed on Feb. 14, 1994, now abandoned.

BACKGROUND OF THE INVENTION

Present invention relates to a telephone apparatus and, more particularly, to a telephone answering apparatus having a voice message storing function.

[Related Art]

Conventionally, a telephone apparatus which, upon receiving an incoming call, transmits a response message and records a message from the calling side is known. Such telephone answering apparatus performs the transmission of response message and recording of the incoming message for all incoming calls by uniform procedure.

When this telephone apparatus is connected to a facsimile apparatus having an automatic switching function for switching the line between telephone and facsimile apparatuses (hereinafter, referred to as "TEL/FAX switching function"), in case of incoming call, the telephone apparatus side starts first. The telephone apparatus closes the line, and at a point where a CNG signal from the line is detected, it switches the line to the facsimile apparatus side.

However, the above telephone apparatus has the following drawbacks.

That is, in a facsimile apparatus which has the TEL/FAX switching function and which is connected to the above telephone answering apparatus, even if a received call is for facsimile communication, the telephone answering apparatus starts to perform recording of an incoming message. Accordingly, signals such as a CNG signal, a manufacturer's unique procedure signal (e.g. an abbreviated procedure signal) and a DTMF signal upon remote control are recorded as incoming messages, thus wasting the incoming message storing capacity.

Further, when the operator tries to reproduce the recorded incoming messages by remote control using such as a DTMF signal, reproducing the recorded signals, i.e., the CNG signal, the manufacturer's unique procedure signal and the DTMF signal may cause erroneous operation of the TEL/FAX switching function of the facsimile apparatus. This sets the facsimile apparatus to a receiving state.

SUMMARY OF THE INVENTION

The present invention has been made in consideration of the above situation, and has as its object to prevent wasting message storing capacity due to recording a tone signal for facsimile identification, and to prevent erroneous operation of a facsimile apparatus due to reproducing the tone signal.

Another object of the present invention is to improve user's operability by enabling judgment as to whether the recorded content is a voice message or a facsimile signal upon reproducing recorded messages by remote control.

Further object of the present invention is to eliminate a recorded DTMF signal upon remote control and a manufacturer's own procedure signal as well as a CNG signal, thus preventing erroneous operation of a facsimile apparatus.

According to one aspect of the present invention, the foregoing objects are attained by providing a telephone apparatus comprising: memory means for storing a message; recording means for recording a voice message inputted from a line; and detection means for detecting a tone signal, wherein, if the detection means detects the tone signal after recording by the recording means has been started, the recording means records a switching message read out of the memory means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail in accordance with the accompanying drawings.

[First Embodiment]

Figure 1:
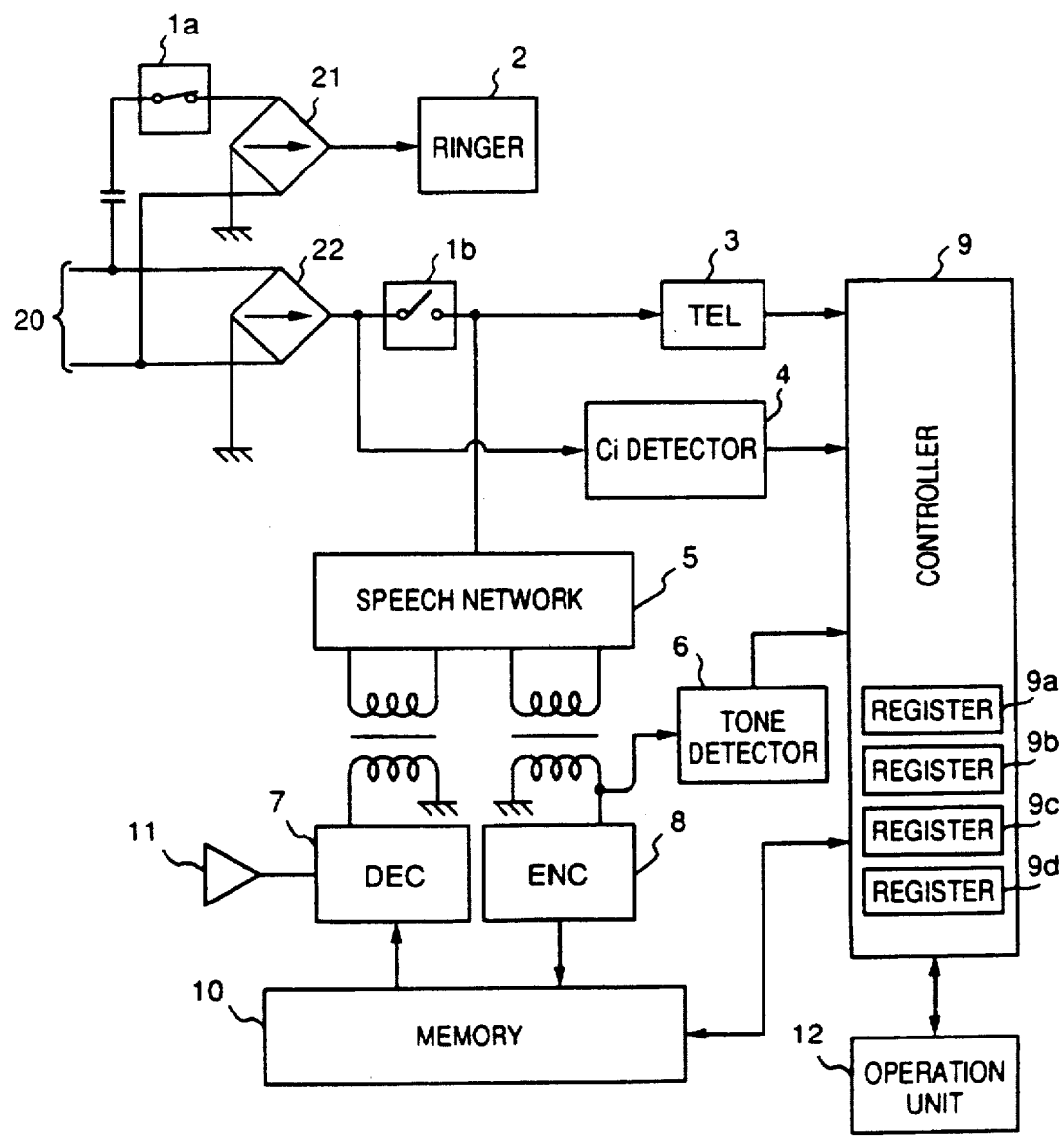
FIG. 1 is a block diagram showing the configuration of a telephone apparatus according to a first embodiment of the present invention.

FIG. 1 is a block diagram showing the configuration of the first embodiment. It should be noted that this embodiment is a telephone answering apparatus having a semiconductor memory for storing voice messages. The apparatus is connected to a telephone (TEL) 3 of a facsimile apparatus.

In FIG. 1, reference numeral 9 denotes a controller, which includes a CPU, a ROM, a RAM and a plurality of registers, for controlling the overall apparatus in accordance with programs stored in the ROM. Numeral 12 denotes an operation unit, connected to the controller 9, for setting an operation mode by key input and displaying the set operation mode.

Numeral 1a and 1b denote a pair of relay contacts for detecting off-hook of the TEL 3 or a Ci signal. The relay contacts 1a and 1b are controlled by the controller 9 after the power is turned on. These relay contacts operate relating to each other. When one relay contact is closed, the other is opened.

Numeral 2 denotes a ringer for emitting ringing sound based on the Call Identification("Ci") signal inputted via a rectifier 21 from a line 20.

Numeral 4 denotes a Ci detector for detecting an incoming call based on the Ci signal inputted via a rectifier 22 from the line 20 and notifying the controller 9 of the detection of incoming call.

Numeral 5 denotes a speech network for two-line- four-line-conversion of a reception/transmission signal.

Numeral 6 denotes a tone detector for detecting tone signals such as a CNG signal (1,100 Hz), a manufacturer's unique procedure signal (e.g. an abbreviated procedure signal) and a DTMF signal upon remote control.

Numeral 10 denotes a memory, comprising e.g. a semiconductor memory, for recording a plurality of digital-coded voice messages. Note that the messages stored in the memory 10 include a response message, an incoming message, and a switching message. The switching message is, e.g., a message "A facsimile communication has been received.".

In the controller 9, a register 9a stores the number of recordings; a register 9b, a recording start address of the incoming message; 9c, a recording start address of the response message; and 9d, a recording start address of the switching message.

It should be noted that the memory 10 is not limited to a semiconductor memory. It may be a flash memory, a hard disk or a floppy disk.

Numeral 7 denotes a decoder (DEC) for decoding a message stored in the memory 10 into an analog voice signal. Note that the voice message is transmitted via the speech network 5 to the line 20, and outputted from a speaker 11.

Numeral 8 denotes an encoder (ENC) for digital-encoding a received voice message to an appropriate code and storing the code in the memory 10.

Figure 2:
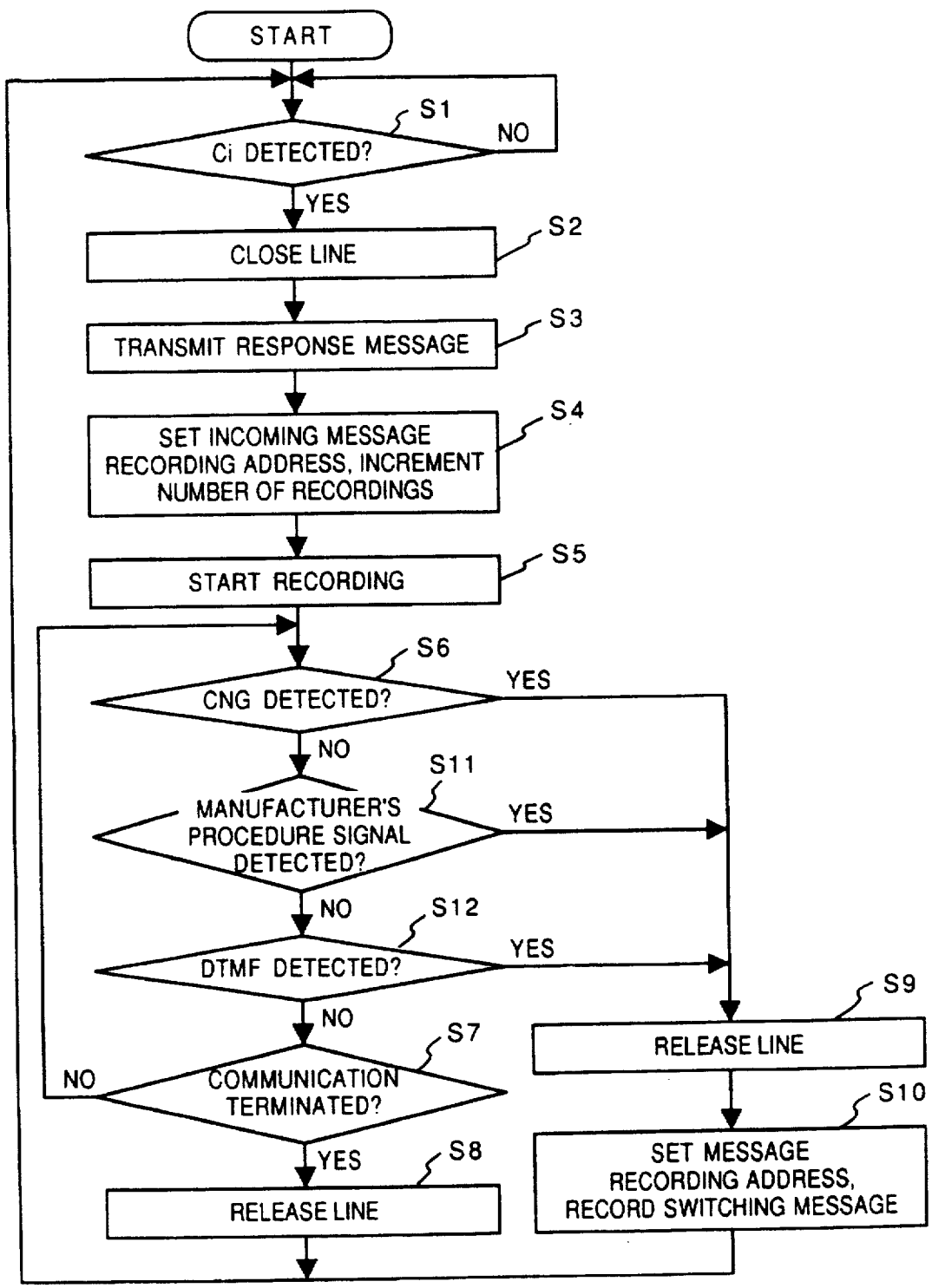
FIG. 2 is a flowchart showing the operation of the first embodiment.

FIG. 2 is a flowchart showing the operation of the present embodiment which is executed by the controller 9 after the power is turned on.

In step S1, detection of a Ci signal by the Ci detector 4 is monitored. When the signal is detected, the relay contact 1b is closed so as to close the line 20 in step S2.

Next, in step S3, the response message stored in the memory 10 is read out and transmitted to the DEC 7, and the analog voice signal resulting from the decoding is transmitted to the line 20. Note that the recording start address of the response message is stored in the register 9c.

Next, in step S4, a writing address of the memory 10 is set to the value stored in the register 9b, i.e., the head address of an empty area for recording incoming messages. Further, the number of recordings stored in the register 9a is incremented. In step S5, the received incoming message is digital-encoded by the ENC 8, and the digital-coded message is sequentially written into the memory 10 from the address set in step S4.

In steps S6, S11 and S12, if a CNG signal, a manufacturer's unique procedure signal, and a DTMF signal upon remote control are not detected for a predetermined period, or if the apparatus at the other end of the line has released the line and a line release signal (BT, silence) transmitted from an exchange is detected for a predetermined period, whether the communication is terminated or not is determined in step S7. If YES, the relay contact 1b is opened to release the line 20, thereafter, the process returns to step S1. The steps S6, S11, S12 and S7 are repeated until it is determined that the communication is terminated in step S7, while the digital-coded incoming message is stored in the memory 10.

It should be noted that after the recording of incoming message into the memory 10 is completed, the controller 9 stores the next address, i.e., the head address of the empty area for storing incoming messages, in the register 9b.

In steps S6, S11 and S12, if a CNG signal, a manufacturer's unique procedure signal or a DTMF signal upon remote control is detected, the relay contact 1b is opened to release the line 20 in step S9. Then in step S10, the switching message stored in the memory 10 is sequentially written from the address set in step S4, so that the CNG signal, the manufacturer's unique procedure signal or the DTMF signal upon remote control is deleted (i.e. writing over the stored signal). Thereafter, the process returns to step S1. Accordingly, an incoming message to be received next will be recorded after the switching message written in step S10.

The controller 9 reads the switching message out of the memory 10 from the address stored in the register 9d, and stores the read message in its RAM. The controller 9 sequentially writes the stored messages from the address of the memory 10 stored in the register 9b to perform the recording of the switching message. When the recording of the switching message is finished, the controller 9 stores the next address of the memory 10, i.e., a head address of the empty area for storing the incoming messages, in the register 9b.

The controller 9 can monitor the operation of the controller of the facsimile apparatus by providing a signal line (not shown in FIG. 1) between the facsimile apparatus and the telephone apparatus. In accordance with the monitored reception state of the facsimile apparatus, the controller 9 can change the switching message to be written into the memory 10. That is, the controller 9 selects a register (not shown) corresponding to the reception state such as "reception with recording sheet" and "reception with memory" and reads a switching message out of the memory 10 from the address stored in the selected register. Thus, the switching message such as "A facsimile correspondence has been printed on recording sheet." and "A facsimile correspondence has been stored in the memory." is written into the memory 10.

As variation of this embodiment, in case where the coding system of the coded switching message stored in the memory 10 and coding system performed on messages via the ENC 8 are different, upon recording the switching message in step S10, the switching message can be converted to an analog voice signal by the DEC 7, thereafter, it can be encoded by the ENC 8 and recorded in the memory 10.

As described above, according to the first embodiment, if a tone signal from the line is detected after starting the recording of a voice message in correspondence with an incoming call, a switching message is recorded. The next recording starts after where the switching message is recorded, thus, preventing storing the tone signal with incoming messages and erroneous operation of the facsimile apparatus caused by reproducing the tone signal.

[Second Embodiment] Next, a telephone apparatus according to the second embodiment of the present invention will be described below. It should be noted that in this embodiment, components identical to those of the first embodiment have the same reference numerals, and the explanation of those components will be omitted.

Figure 3:
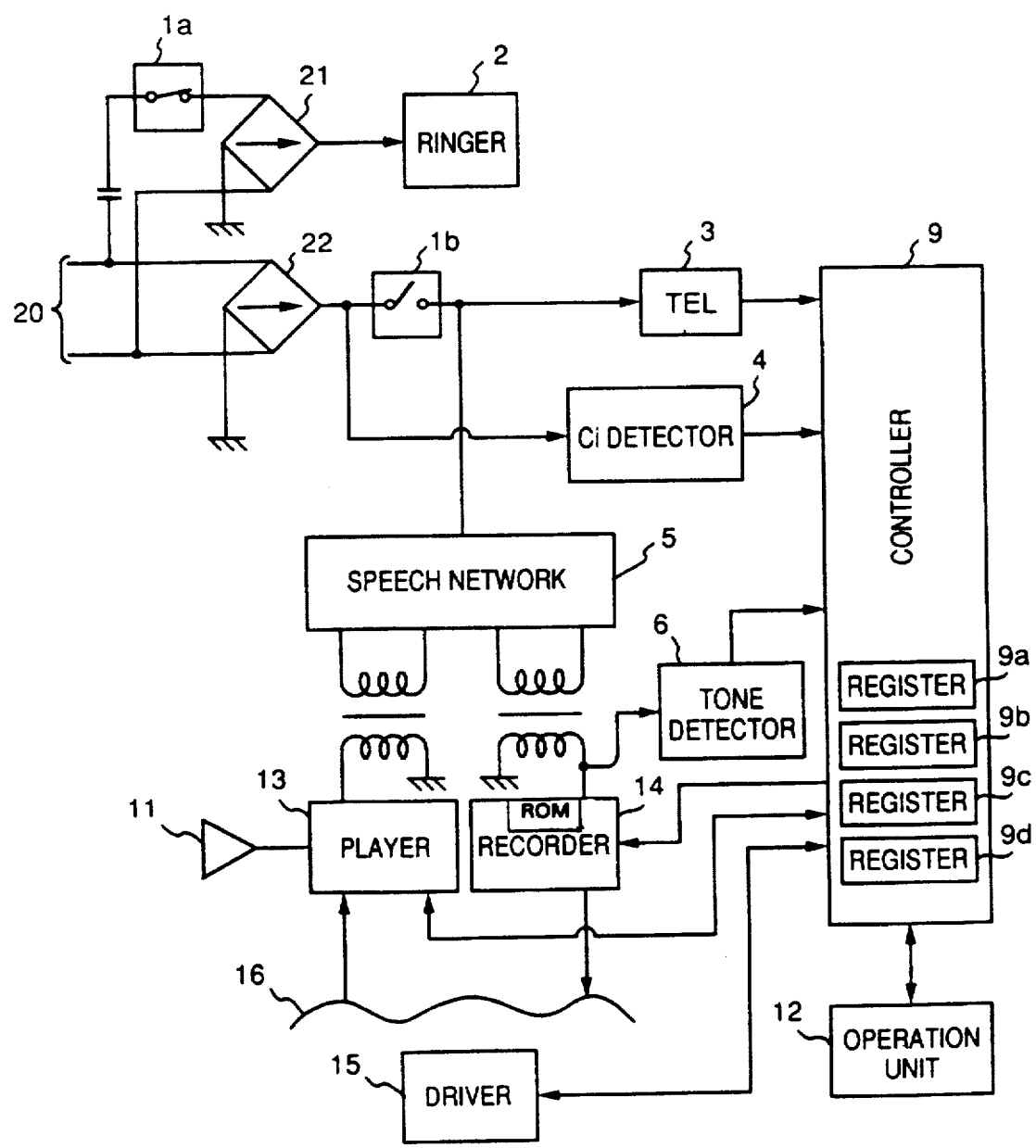
FIG. 3 is a block diagram showing the configuration of a telephone apparatus according to a second embodiment of the present invention.

FIG. 3 is a block diagram showing the configuration of the telephone apparatus in the second embodiment. This telephone apparatus is a telephone answering apparatus having a magnetic tape recorder for storing voice messages. In this apparatus, a driver 15, a recorder 14 and a player 13 for recording/reproducing of a magnetic tape 16 are provided instead of the DEC 7, ENC 8 and the memory 10 of the first embodiment.

The player 13 includes a reproducing head and an amplifier for reproducing messages recorded on the magnetic tape 16.

The recorder 14 includes an erase head, a recording head and an amplifier for recording a response message, a switching message and a received incoming message. The recorder 14 includes a ROM in which the digitized switching message is stored. The recorder 14 reads out the message from the ROM and converts the message into an analog voice signal in accordance with instruction from the controller 9.

The driver 15 includes a motor for driving tape reels and a capstan, a motor driver, and a counter for detecting a recording position of the magnetic tape 16, for forward/reverse-winding the magnetic tap 16. The counter counts a signal pre-recorded in the magnetic tape 16 or the number of revolutions of the capstan or the motor. When the magnetic tape 16 is exchanged, the count value is reset to zero, i.e., a value indicative of the start of the tape. At this time, the registers 9a, 9b and 9c in the controller 9 are also reset to zero.

Figure 4:
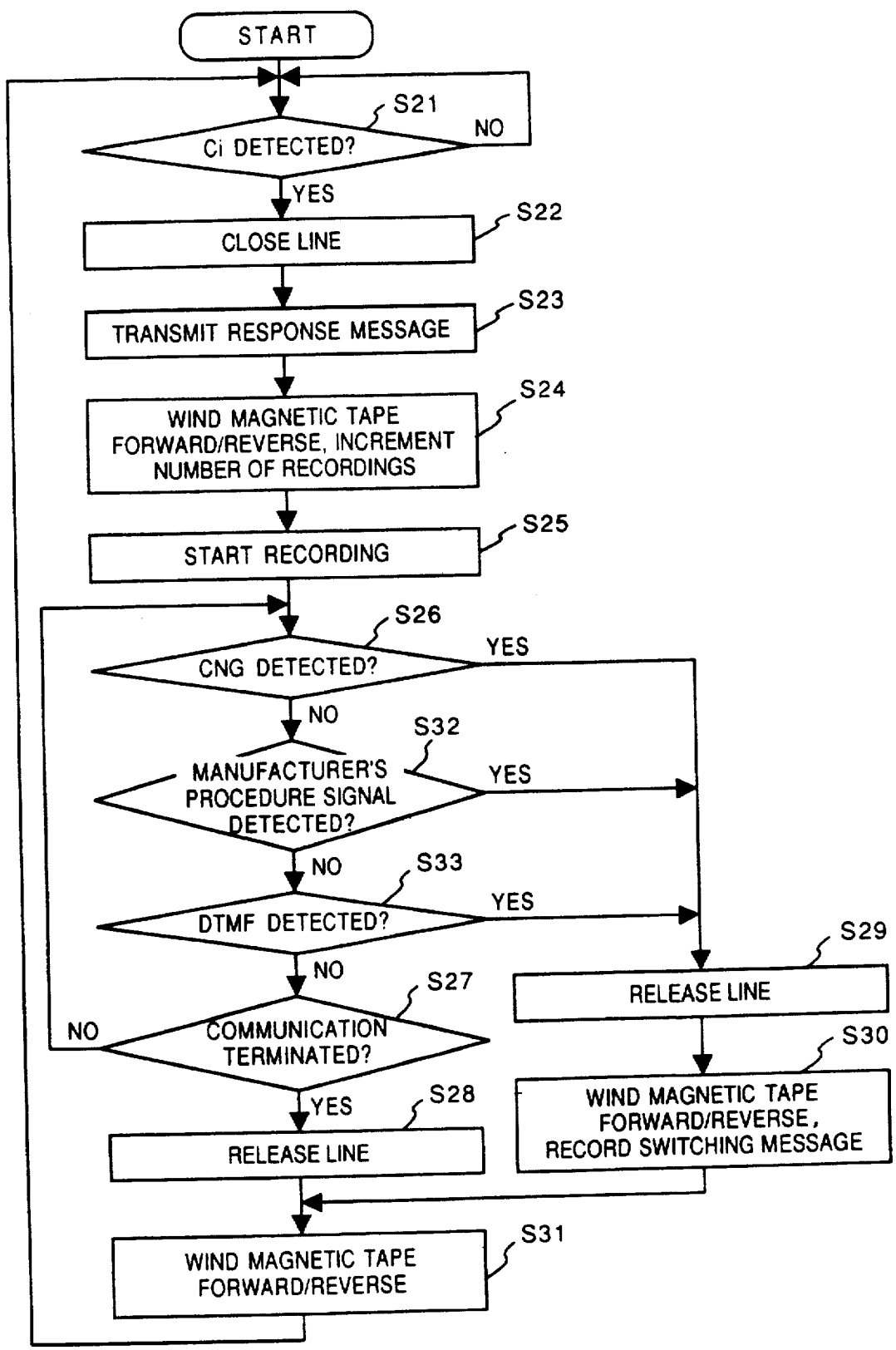
FIG. 4 is a flowchart showing the operation of the second embodiment.

FIG. 4 is a flowchart showing the operation of the present embodiment which is executed by the controller 9 after the power is turned on.

In step S21, the Ci detector 4 is used to detect a Ci signal is monitored. If the Ci signal is detected, the relay contact 1b is closed so as to close the line 20 in step S22. Next, in step S23, the driver 15 drives the magnetic tape 16. The player 13 reproduces the response message recorded on the magnetic tape 16 and transmits the message to the line 20. It should be noted that the termination of reproduction of the response message is detected by a specific signal recorded at the end of the message.

Next, in step S24, the driver 15 winds the magnetic tape 16 forward/reverse so that the start of the unrecorded portion of the magnetic tape 16 comes to the recording head of the recorder 14. At the same time, the number of recordings in the register 9a is incremented. In step S25, the recorder 14 records the received incoming message on the magnetic tape 16.

It should be noted that the starting position of the unrecorded portion is stored in the register 9b. The driver 15 receives the position data and winds the magnetic tape 16 forward/reverse till the counter value corresponds with the instructed value (i.e. the value in the register 9b) so that the start of the unrecorded portion comes to the recording head.

In steps S26, S32 and S33, in case where the tone detector 6 does not detect a CNG signal, a manufacturer's unique procedure signal or a DTMF signal upon remote control for a predetermined period, if a silence signal is detected for a predetermined period, or if the apparatus of the opposite end of the line releases the line and a line release signal (BT, silence) transmitted from the exchange is detected for a predetermined period, it is determined in step S27 that the communication is terminated. In step S28, the relay contact 1b is opened to release the line 20, then the process proceeds to step S31. In this embodiment, steps S26, S32, S33 and S27 are repeated until it is determined that the communication is terminated in step S27, while the incoming message is recorded on the magnetic tape 16.

In steps S26, S32 and S33, if the tone detector 6 detects a CNG signal, a manufacturer's unique procedure signal or a DTMF signal upon remote control, the relay contact 1b is opened in step S29 to release the line 20. In step S30, the magnetic tape 16 is wound forward/reverse to the position set in step S24, so that the switching message stored in the recorder 14 is recorded on the magnetic tape 16 over the CNG signal, the manufacturer's procedure signal or the DTMF signal, thus deleting the signal recorded there. Thereafter, the process proceeds to step S31. Accordingly, an incoming message to be recorded next will be recorded after the switching message recorded in step S30.

Similarly to the first embodiment, the controller 9 can change the switching message to be recorded on the magnetic tape 16 in step S30 in correspondence with the reception state of the facsimile apparatus such as "reception with recording sheet" and "reception with memory".

Next, the controller 9 winds the magnetic tape 16 forward/reverse so that the start of the response message comes to the reproducing head of the player 13. Then, the process returns to step S21.

It should be noted that the controller 9 records the counter value of the driver 15, i.e., the starting position of the unrecorded portion, in its register 9c before the winding of the magnetic tape 16 is started in step S31. The start position for recording the response message is stored in the register 9c. The driver 15 that obtains the position winds the magnetic tape 16 forward/reverse until the counter value corresponds with the instructed value (i.e. the value stored in the register 9c) so that the start of the response message comes to the reproducing head.

As described above, according to the present embodiment, after the recording of incoming message is started in correspondence with an incoming call, if a tone signal from the line is detected, a switching message is recorded. The next recording is started after where the switching message is recorded, which prevents recording the tone signal and erroneous operation of the facsimile apparatus caused by reproduction of recorded tone signal.

The present invention can be applied to a system constituted by a plurality of devices, or to an apparatus comprising a single device. Furthermore, the invention is also applicable to a device having both facsimile communication function and voice recording function.

The present invention can provide a telephone apparatus which, in case where a tone signal is detected after recording is started, records a prestored message from the recording start position. This prevents wasting message storing capacity by recording a tone signal for facsimile identification and erroneous operation of the facsimile apparatus caused by reproducing the recorded tone signal.

Further, in case where recorded incoming messages are reproduced by remote control, the present invention provides distinction of the recorded messages as to whether the message is a voice message or facsimile signal, and the number of recordings, thus improves operability for the user.

Further, the present invention deletes a DTMF signal upon remote control, a manufacturer's unique procedure signal e.g. an abbreviated facsimile number as well as a CNG signal, which prevents erroneous operation of the facsimile apparatus.

The present invention is not limited to the above embodiments and various changes and modifications can be made within the spirit and scope of the present invention. Therefore, to apprise the public of the scope of the present invention, the following claims are made.

What is claimed is:

1. A telephone apparatus comprising:

memory means for storing a message;

recording means for recording a voice message inputted from a line; and detection means for detecting a tone signal, wherein, if said detection means detects the tone signal after said recording means has started the recording, said recording means records a switching message read out of said memory means so that the tone signal is written over by the switching message.

2. The apparatus according to claim 1, wherein if said detection means does not detect the tone signal for a predetermined period, if said detection means detects a silence signal for a predetermined period, or if said detection means detects a line release signal for a predetermined period, said recording means terminates recording of the voice message.

3. The apparatus according to claim 1, wherein said recording means includes a register for storing a number of recordings, and increments a value stored in the register upon start of recording.

4. The apparatus according to claim 1, wherein said recording means starts the recording of the switching message from a position where the recording of the voice message has been started.

5. The apparatus according to claim 2, wherein the tone signal is a CNG signal, a manufacturer's unique procedure signal or a DTMF signal.

6. The apparatus according to claim 5, wherein the manufacturer's unique procedure signal is an abbreviated procedure signal.

7. The apparatus according to claim 2, wherein said recording means includes a first register for, after recording of the voice message or the switching message is terminated, storing a next recording start position.

8. The apparatus according to claim 7, wherein said recording means records the voice message and the switching message in said memory means.

9. The apparatus according to claim 8, wherein said memory means is a semiconductor memory for storing a plurality of messages.

10. The apparatus according to claim 9, wherein said recording means includes an encoder for encoding a message, and said recording means encodes the voice message by the encoder and records the coded message in the memory means.

11. The apparatus according to claim 10, wherein said recording means includes a decoder for decoding the coded message stored in said memory means.

12. The apparatus according to claim 9, wherein the switching message is a message encoded from a voice signal and is stored in said memory means.

13. The apparatus according to claim 12, wherein said recording means includes a second register for storing a storing position of the switching message.

14. The apparatus according to claim 8, wherein said memory means is a magnetic tape for storing a plurality of messages.

15. The apparatus according to claim 14, wherein said recording means includes a driver for driving the magnetic tape, and the driver controls a recording position of the magnetic tape by a counter.

16. The apparatus according to claim 14, wherein said recording means includes a recorder for recording a message on the magnetic tape.

17. The apparatus according to claim 16, wherein said recording means includes a player for reproducing the message recorded on the magnetic tape and outputting a voice signal.

18. The apparatus according to claim 16, wherein the switching message is a digitized voice signal recorded in a ROM in the recorder.

19. A message recording method comprising the steps of:

recording a first message;

discriminating whether or not the first message includes a control signal; and replacing the recorded first message with a predetermined second message when it is discriminated that the first message includes the control signal, so that the control signal is not reproduced.

20. The method according to claim 19, wherein said discriminating step, a CNG signal is discriminated as the control signal.

21. The method according to claim 19, wherein in said discriminating step, a DTMF signal is discriminated as the control signal.

22. The method according to claim 19, wherein the predetermined second message is recorded onto where the first message including the control signal was recorded.

* * * * *

UNITED STATES PATENT AND TRADEMARK OFFICE
CERTIFICATE OF CORRECTION

PATENT NO. : 5,594,783

DATED : January 14, 1997

INVENTOR(S) : Fumihiko Ito

It is certified that error appears in the above-indentified patent and that said Letters Patent is hereby corrected as shown below:

On the title page, at [22], please change "April 18, 1996" to --April 15, 1996--.

Signed and Sealed this

Eighth Day of July, 1997

*Attest:*

BRUCE LEHMAN

*Attesting Officer*  *Commissioner of Patents and Trademarks*